United States Patent [19]

DeRosa et al.

[11] Patent Number: 5,308,523

[45] Date of Patent: * May 3, 1994

[54] VI IMPROVER, DISPERSANT, AND ANTIOXIDANT ADDITIVE AND LUBRICATING OIL COMPOSITION

[75] Inventors: Thomas F. DeRosa, Passaic, N.J.; Ronald W. Von Allmen, Glenham, N.Y.; Benjamin J. Kaufman, Hopewell Junction, N.Y.; Rosemary J. Jennejahn, Nelsonville, N.Y.

[73] Assignee: Texaco Inc., White Plains, N.Y.

[*] Notice: The portion of the term of this patent subsequent to May 7, 2008 has been disclaimed.

[21] Appl. No.: 587,136

[22] Filed: Sep. 24, 1990

[51] Int. Cl.$^5$ .......................................... C10M 149/06
[52] U.S. Cl. ................................. 252/51.5 A; 252/50; 252/51; 252/51.5 R; 525/333.6
[58] Field of Search .................... 252/51.5 A, 51.5 R, 252/50, 51; 525/333.6

[56] References Cited

U.S. PATENT DOCUMENTS 5,013,469  5/1991  De Rosa et al. ................... 252/47.5
5,075,383 12/1991  Migdal et al. ......................... 252/50
5,112,508  5/1992  DeRosa et al. ................ 252/51.5 A

*Primary Examiner*—Jacqueline V. Howard

[57] ABSTRACT

An additive composition prepared by the steps comprising:

(a) reacting a styrene-ethylene butylene-styrene block copolymer having styrene-ethylene-butylene-styrene molecular weight ratios, respectively, of 1:6:1 to 1:3:1 characterized in that unsaturation in the styrene blocks is equal to or greater than 50 percent and the ethylene butylene block is hydrogenated leaving no more than 10 percent unsaturation, with at least one olefinic carboxylic acid acylating agent to form one or more acylating reaction intermediates characterized by having a carboxylic acid acylating function within their structure, and (b) reacting said reaction intermediate in (a) with a hydrocarbon substituted or unsubstituted N-naphthyl-phenylenediamine or mixtures thereof and a lubricating oil composition containing same are provided.

17 Claims, No Drawings

VI IMPROVER, DISPERSANT, AND ANTIOXIDANT ADDITIVE AND LUBRICATING OIL COMPOSITION

BACKGROUND OF THE INVENTION

This invention relates to a novel multi-functional lubricant additive which is a VI improver, a dispersant and an antioxidant additive when employed in a lubricating oil composition.

DISCLOSURE STATEMENT

The art contains many disclosures on the use of polymer additives in lubrication oil compositions. Ethylene-propylene copolymers and ethylene-alpha olefin non-conjugated diene terpolymers which have been further derivatized to provide bi-functional properties in lubricating oil compositions illustrate this type of oil additive.

U.S. Pat. No. 3,522,180 discloses a method for the preparation of an ethylene-propylene copolymer substrate effective as a viscosity index improver for lubricating oils.

U.S. Pat. No. 4,026,809 discloses graft copolymers of a methacrylate ester and an ethylene-propylene-alkylidene norbornene terpolymer as a viscosity index improver for lubricating oils.

U.S. Pat. No. 4,089,794 discloses ethylene copolymers derived from ethylene and one or more $C_3$ to $C_{28}$ alpha olefin solution grafted with an ethylenically-unsaturated carboxylic acid material followed by a reaction with a polyfunctional material reactive with carboxyl groups, such as a polyamine, a polyol, or a hydroxyamine, which reaction product is useful as a sludge and varnish control additive in lubricating oils.

U.S. Pat. No. 4,137,185 discloses a stabilized imide graft of ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graft monomer of C-vinylpyridine or N-vinylpyrrolidone to provide a dispersant VI improver for lubricating oils.

U.S. Pat. No. 4,320,019 discloses a multi-purpose lubricating additive prepared by the reaction of an interpolymer of ethylene and a $C_3$ to $C_8$ alpha-monoolefin with an olefinic carboxylic acid acylating agent to form an acylating reaction intermediate which is then reacted with an amine.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction, followed by a reaction with a monoamine-polyamine mixture.

U.S. Pat. No. 4,382,007 discloses a dispersant—VI improver prepared by reacting a polyamine-derived dispersant with an oxidized ethylene-propylene polymer or an ethylene-propylene diene terpolymer.

U.S. Pat. No. 4,259,540 and U.S. Pat. No. 4,798,853 disclose styrene-ethylenebutylene-styrene block copolymers having a styrene-rubber ratio of from about 0.2 to 0.5 which is useful as a waterproof filling material for electrical cables.

U.S. Pat. No. 4,863,623 discloses a grafted ethylene-propylene copolymer or terpolymer which has been derivatized with an amino-aromatic polyamine compound and a lubricating oil composition containing same.

Elastomerics 120 (10) 30-2 is a treatise on elastomers in general.

European Patent Application 0173380 discloses block copolymers exhibiting improved elastomeric properties.

U.S. Pat. No. 5,013,469 discloses block copolymers which have been grafted and derivatized with an amino-aromatic polyamine compound.

The disclosures in the foregoing patents which relate to VI improvers and dispersants for lubricating oils; namely, U.S. Pat. Nos. 3,522,180, 4,026,809, 4,089,794, 4,137,185, 4,146,489, 4,320,019, 4,340,689, 4,357,250, 4,382,007, 4,259,540, 4,427,828, 4,798,853, 4,863,623, Elastomerics 120 (10) 30-2, and European Patent Application 0173380 are incorporated herein by reference.

An object of this invention is to provide a novel derivatized graft block copolymer composition.

Another object of the invention is to provide a multi-functional lubricant additive effective for imparting viscosity index, dispersancy, and antioxidant properties to a lubricating oil composition.

A further object is to provide a novel lubricating oil composition containing the derivatized graft block copolymer additive of the invention, as well as to provide concentrates of the novel additive of invention.

SUMMARY OF THE INVENTION

The novel reaction product of the invention comprises a styrene-ethylene butylene-styrene block copolymer having an S-EB-S molecular weight ratio of 1:6:1 to 1:3:1 on which has been grafted an ethylenically unsaturated acid anhydride and/or carboxylic acid function which is then further derivatized with a hydrocarbyl substituted or unsubstituted N-naphthyl-phenylenediamine represented by the formula:

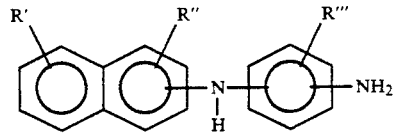

in which each of R', R" and R''' may be hydrogen or an alkyl radical having from 1 to 5 carbon atoms.

The novel lubricant of the invention comprises an oil of lubricating viscosity and an effective amount of the novel reaction product. The lubricating oil will be characterized by viscosity index improving, dispersancy, and antioxidant properties.

Concentrates of the reaction product of the invention are also contemplated.

DETAILED DESCRIPTION OF THE INVENTION

The block copolymer substrate employed in the novel additive of the invention may be prepared from styrene, ethylene and butadiene to produce a styrene-ethylenebutylene-styrene (S-EB-S) block copolymer having an S-EB-S molecular weight ratio of 1:6:1 to 1:3:1.

The polymerization reaction to form the block copolymer substrate may be carried out in the presence of a catalyst in a solvent medium. The polymerization solvent may be any suitable inert organic solvent that is liquid under reaction conditions for solution polymerization of olefins which is generally conducted in the presence of a Ziegler or a Ziegler-Natta type catalyst. Examples of satisfactory hydrocarbon solvents include straight chain paraffins having from 5 to 8 carbon atoms, with hexane or cyclohexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. It is desirable that the solvent be free of substances that will interfere with a Ziegler polymerization reaction.

The polymeric materials used are substantially linear hydrocarbon block copolymers. It is more specifically a hydrogenated styrene-ethylenebutylene-styrene (S-EB-S) block copolymer having a styrene-rubber ratio approximately 0.2 to 0.5. The monoalkylenyl aromatic hydrocarbon (average molecular weight 1,000 to 115,000) contained in the rubber comprises 5% to 95% of the terpolymer. Another block component, a conjugated diene, viz. butadiene, is the second component of this rubber (average molecular weight 20,000 to 450,000). The material that is ultimately generated has a styrene rubber ratio of approximately 0.2 to 0.5. Upon selective hydrogenation using Raney Nickel or Group VIII metals, such as Pt or Pd, >50% of the initial unsaturation contained in the monoalkylenyl aromatic hydrocarbon remains and >10% of the initial unsaturation contained in the butadiene remains. This has the advantage of permitting subsequent melt-mixing of graftable monomer or monomers through an extruder and thermally initiating the free radical graft reaction with or without a free radical thermal initiator.

Di-, tri- or multi-block copolymers are synthesized using anionic initiators, typically, but not restricted to, Ziegler-Natta catalysis materials. In those cases where Ziegler-Natta materials are used, transition metal salts are reacted with Group Ia, IIa, or IIIa metal halides under anhydrous and oxygen-free conditions in a variety of inert solvents. This method is very well known and described in the art. Other anionic catalysis are known, including using Group Ia metals directly. This method is also well known and thereto described in the art.

Polymeric materials containing hydrogenated block segments of hydrogenated styrene-ethylene-butylene-styrene are available commercially and are sold under the trade name Kraton ® FG1901X.

An ethylenically unsaturated material containing pendant acid anhydride and carboxylic acid groups is grafted onto the prescribed polymer backbone. These materials, which are attached to the polymer, contain at least one ethylenic bond and at least one, preferably two, carboxylic acid or its anhydride groups or a polar group which is convertible into a carboxyl group by oxidation or hydrolysis. Maleic anhydride or a derivative thereof is preferred. It grafts onto the block copolymer to give two carboxylic acid functionalities. Examples of additional unsaturated carboxylic materials include chlormaleic anhydride, itaconic anhydride, or the corresponding dicarboxylic acids, such as maleic acid, fumaric acid and their monoesters.

The ethylenically unsaturated carboxylic acid material may be grafted onto the block copolymer backbone in a number of ways. It may be grafted onto the backbone by a thermal process known as the "ene" process or by grafting in solution or in solid form using a radical initiator. The free-radical induced grafting of ethylenically unsaturated carboxylic acid materials in solvents, such as benzene, is a preferred method. It is carried out at an elevated temperature in the range of about 100° C. to 250° C., preferably 120° C. to 190° C., and more preferable at 150° C. to 180° C., e.g., above 160° C., in a solvent, preferably a mineral lubricating oil solution containing, e.g., 1 to 50, preferably 5 to 30 weight percent, based on the initial total oil solution, of the block copolymer and preferably under an inert environment.

The free-radical initiators which may be used are peroxides, hydroperoxides, and azo compounds, and preferably those which have a boiling point greater than about 100° C. and decompose thermally within the grafting temperature range to provide free radicals. Representative of these free-radical initiators are azobutyronitrile and 2,5-dimethyl-hex-3-yne-2, 5-bis-tertiary-butyl peroxide. The initiator is used in an amount of between about 0.005% and about 1% by weight based on the weight of the reaction mixture solution. The grafting is preferably carried out in an inert atmosphere, such as under nitrogen blanketing. The resulting graft block copolymer intermediate is characterized by having carboxylic acid acylating functions within its structure.

In the solid or melt process for forming a graft block copolymer, the unsaturated carboxylic acid with the optional use of a radical initiator is grafted on molten rubber using rubber masticating or shearing equipment. The temperature of the molten material in this process may range from about 150° C. to 400° C. using a twin-screw extruder. The temperature in the barrel is such that the free radical initiator is activated and maleic anhydride grafts exclusively to the EP portion of the terpolymer without decomposition of polymeric material.

The block copolymer intermediate possessing acid anhydride and carboxylic acid acylating functions is reacted with a hydrocarbyl substituted or unsubstituted N-naphthyl-phenylenediamine. These materials are represented by the generic formula:

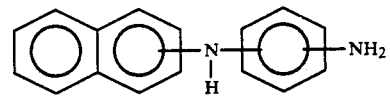

More specifically, these compounds may be represented by the formula:

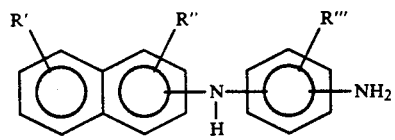

in which each of R', R" and R'" may be hydrogen or an alkyl radical having from 1 to 5 carbon atoms.

Specific N-naphthyl-phenylenediamines which may be employed include:.
N-(1-naphthyl)-m-phenylenediamine,
N-(1-naphthyl)-p-phenylenediamine,
N-(2-naphthyl)-m-phenylenediamine, and
N-(2-naphthyl)-p-phenylenediamine.

The processing for preparing this multi-functional VI improver involves charging diluent oil and solid grafted rubber Kraton ® to the reaction flask and dissolving the rubber in oil at 160° C. under a nitrogen blanket. An N-naphthyl-phenylenediamine is then charged as a neat granular solid or as a 10% to 20% solution in an oil soluble solvent, such as commercial alkyl or alkylaryl polyethylene or propylene glycol. The imidization step of reacting the N-naphthyl-phenylenediamine with the polymer-bound succinic anhydride groups is carried out over several hours at the aforementioned temperature under nitrogen. On completion of the reaction, the material is cooled to 100° C. and screen filtered through a 100 mesh filter and the product isolated. This VI improver may be added to lubricating oils to impart viscosity index improvement, dispersancy, and thermal-oxidative stability.

The following examples illustrate the preparation of the novel reaction product additive of the invention.

EXAMPLE I 60 grams of a solid maleic anhydride graft styrene-ethylene-butylene-styrene block copolymer (S-EB-S Kraton R rubber) having an average molecular weight for S-EB-S of 7,500–37,500–7,500, respectively, on which is grafted 0.2 to 4.6 weight percent of maleic anhydride, is dissolved in 485 grams of solvent neutral oil at 160° C. with mechanical stirring while the mixture is maintained under nitrogen. The rubber block polymer is dissolved and mixing and heating continued for an additional hour at 160° C. 2.17 grams of neat N-(1-naphthyl)-p-phenylenediamine is added to the oil solution of the polymer and the reaction is effected over four hours at 160° C. under nitrogen with mechanical stirring. The reaction mixture containing the derivatized graft block polymer is filtered through an 80 mesh filter and cooled.

EXAMPLE II

N-(1-naphthyl)-m-phenylenediamine is substituted for N-(1-naphthyl)-p-phenylene in the aforementioned example.

EXAMPLE III

N-(2-naphthyl)-p-phenylenediamine is substituted in Example I.

EXAMPLE IV (N-2-naphthyl)-m-phenylenediamine is substituted in Example I.

EXAMPLE V

A mixture consisting of a weight ratio of N-(1-naphthyl)-p-phenylenediamine and N-(1-naphthyl)-m-phenylenediamine is substituted in Example I.

EXAMPLE VI

A mixture consisting of a 1:1 weight ratio of N-(1-naphthyl)-p-phenylenediamine and N-(2-naphthyl)-p-phenylenediamine is substituted in Example I.

EXAMPLE VII

A mixture consisting of a weight ratio of N-(1-naphthyl)-p-phenylenediamine and N-(2-naphthyl)-m-phenylenediamine is substituted in Example I.

EXAMPLE VIII

A mixture consisting of a weight ratio of N-(2-naphthyl)-p-phenylene and N-(2-naphthyl)-m-phenylenediamine is substituted in Example I.

EXAMPLE IX

A mixture consisting of a 1:1:1 weight ratio of N-(1-naphthyl)-p-phenylenediamine, N-(1-naphthyl)-m-phenylenediamine, and N-(2-naphthyl)-p-phenylenediamine is substituted in Example I.

EXAMPLE X

A mixture consisting of a 1:1:1 weight ratio of N-(1-naphthyl)-p-phenylenediamine, N-(1-naphthyl)-m-phenylenediamine, and N-(2-naphthyl)-m-phenylenediamine is substituted in Example I.

EXAMPLE XI

A mixture consisting of a 1:1:1 weight ratio of N-(1-naphthyl)-m-phenylenediamine, N-(2-naphthyl)-p-phenylenediamine, and N-(2-naphthyl)-m-phenylenediamine is substituted in Example I.

EXAMPLE XII

A mixture consisting of a 1:1:1:1 weight ratio of N-(1-naphthyl)-p-phenylenediamine, N-(1-naphthyl)-m-phenylenediamine, N-(2-naphthyl)-p-phenylenediamine, and N-(2-naphthyl)-m-phenylenediamine is substituted in Example I.

The novel graft and derivatized block copolymer of the invention is useful as an additive for lubricating oils. These products are multi-functional additives for lubricants being effective to provide dispersancy, viscosity index improvement and antioxidant properties to lubricating oils. They can be employed in a variety of oils of lubricating viscosity, including natural and synthetic lubricating oils and mixtures thereof. The novel additives can be employed in crankcase lubricating oils for spark-ignited and compression-ignited internal combustion engines. The compositions can also be used in gas engines or turbines, automatic transmission fluids, gear lubricants, metal-working lubricants, hydraulic fluids, and other lubricating oil and grease compositions. Their use in motor fuel compositions is also contemplated. Mixtures of the graft and derivatized block copolymers of the invention may be employed. In this case, equal weight ratio mixtures are particularly preferred.

The base oil may be a natural oil including liquid petroleum oils and solvent-treated or acid-treated mineral lubricating oils of the paraffinic, naphthenic and mixed paraffinic-naphthenic types.

In general, the lubricating oil composition of the invention will contain the novel reaction product in a concentration ranging from about 0.1 to 15 weight percent. A preferred concentration range for the additive is from about 0.1 to 10 weight percent based on the total weight of the oil composition.

Oil concentrates of the additive may contain from about 1 to 30 weight percent of the additive reaction product in a carrier or diluent oil of lubricating oil viscosity.

The novel reaction product of the invention may be employed in lubricant compositions together with conventional lubricant additives. Such additives may include additional dispersants, detergents, antioxidants, pour point depressants, anti-wear agents, and the like.

The novel additive reaction product of the invention is tested for its effectiveness as a dispersant and as an antioxidant in a formulated lubricating oil composition. The base lubricating oil used in the dispersancy test is a typical formulated lubricating oil with representative values illustrated in Table I.

TABLE I

| Component | Parts by Weight |
|---|---|
| Solvent Neutral Oil A | 75.25 |
| Solvent Neutral Oil B | 21.64 |
| Zinc Dialkyldithiophosphate | 1.22 |
| 4,4'Dinonyldiphenylamine | .39 |
| Overbased Magnesium Sulfonate | 1.50 |
| Silicone Antifoamant | 150 ppm |
| Product | 10 |
| Analyses | |
| Viscosity Kin 40° C. CS | 30.4 |
| Viscosity Kin 100° C. CS | 5.33 |
| Pour Point, F. | +10 |
| Ash Sulfated, % D874 | 0.88 |
| Phosphorus, % X-ray | 0.12 |
| Sulfur, % X-ray Total | 0.32 |
| Zinc, % X-ray | 0.13 |

Oil A has a sp. gr. 60/60° F. of 0.858–0.868; Vis. 100° F. 123–133; Pour Point 0° F. Oil B is sp. gr. 60/60° F. of 0.871–0.887; Vis. 100° F. 325–350; Pour Point +10° F. Zinc salt is a salt of mixed alcohols-isopropanol and $P_2S_2$ product as described in U.S. Pat. No. 3,292,181. The overbased magnesium sulfonate has a TBN of 395 and is a salt of branched $C_{20}$ to $C_{40}$ monoalkyl benzene sulfuric acid (MW 530–540) together with about 10% magnesium carbonate, 14% magnesium hydroxide, and 4% magnesium sulfate.

The dispersant properties of the additive-containing oil are determined in the Bench VC Dispersancy Test (BVCT). Dispersancy of a lubricating oil is determined relative to three reference results from three standard blends tested along with the unknown. The test additives are blended into a formulated oil containing no dispersant. The additive reaction product is employed in the oil at a concentration of 1.5 weight percent polymer solution. The numerical value of the test results decreases with an increase in effectiveness.

TABLE II

| BENCH VC DISPERSANCY TEST | | |
|---|---|---|
| Run | Additive | Result |
| 1 | Comparison[1] | 98 |
| 2 | Example I | 33 |
| 3 | Example III | 34 |
| 4 | Commercial N-vinylpyrrolidone | 29 |

[1]Base oil containing 1.5 weight percent of styrene-ethylene-butylene-styrene block polymer.

The test results establish the highly effective dispersancy properties of the novel reaction product of the invention in comparison to the underivatized block copolymer and a known commercial additive.

The antioxidant properties of the novel reaction product in a lubricating oil is determined in the Bench Oxidation Test. In this test, 1.5 weight percent of the additive reaction product is blended into solvent neutral oil (S.U.S. at 100° F. of 130). The mixture is continuously stirred while being heated accompanied by bubbling with air. Samples are withdrawn periodically for analysis by Differential Infrared Absorption (DIR) to observe changes in the intensity of the carboxyl vibration band at 1710 $cm^{-1}$. A low carboxyl vibration band intensity indicates higher thermal-oxidative stability of the sample.

TABLE III

| BENCH OXIDATION TEST | | |
|---|---|---|
| Run | Additive | Result |
| 1 | Comparison[1] | 77 |
| 2 | Example I | 1.2 |
| 3 | Commercial N-vinylpyrrolidone-grafted dispersant olefin copolymer (DOCP) | 15 |

[1]Base oil containing 1.2 weight percent of styrene-ethylene-butylene-styrene block polymer.

The test results for Example I demonstrates a substantial improvement in antioxidant properties due to incorporation of the novel reaction product of the invention in an oil composition as compared to the results obtained using a known dispersant VI improver and the underivatized graft block copolymer rubber.

What is claimed is:

1. An additive composition prepared by the steps comprising:
   (a) reacting a styrene-ethylene butylene-styrene block copolymer having styrene-ethylene butylene-styrene molecular weight ratios, respectively, of 1:6:1 to 1:3:1 characterized in that unsaturation in the styrene blocks is equal to or greater than 50 percent and the ethylene butylene block is hydrogenated leaving no more than 10 percent unsaturation, with at least one olefinic carboxylic acid acylating agent to form one or more acylating reaction intermediates characterized by having a carboxylic acid acylating function within their structure, and
   (b) reacting said reaction intermediate in (a) with a hydrocarbon substituted or unsubstituted N-naphthyl-phenylenediamine represented by the formula:

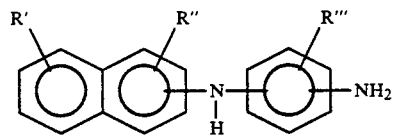

in which each of R', R" and R'" represent hydrogen or an alkyl radical having from 1 to 5 carbon atoms.

2. A composition according to claim in which said copolymer has an average molecular weight from about 25,000 to 250,000.

3. A composition according to claim 1 in which said copolymer has an average molecular weight from about 50,000 to 150,000.

4. A composition according to claim 1 in which said olefinic carboxylic acid acylating agent is maleic anhydride.

5. A composition according to claim 1 in which said olefinic carboxylic acid acylating agent is itaconic anhydride.

6. A composition according to claim 1 in which said N-naphthyl-phenylenediamine is N-(1-naphthyl)-m-phenylenediamine.

7. A composition according to claim 1 in which said N-naphthyl-phenylenediamine is N-(1-naphthyl)-p-phenylenediamine.

8. A lubricating oil composition comprising a major amount of an oil of lubricating viscosity and a minor amount effective to impart viscosity index, dispersancy, and antioxidant properties to said oil of an additive composition prepared by the steps comprising:

(a) reacting a styrene-ethylenebutylene-styrene block copolymer having styrene-ethylenebutylene-styrene molecular weight ratios, respectively, of 1:6:1 to 1:3:1 characterized in that unsaturation in the styrene blocks in equal to or greater than 50 percent and the ethylenebutylene block is hydrogenated leaving no more than 10 percent unsaturation, with at least one olefinic carboxylic acid acylating agent to form one or more acylating reaction intermediates characterized by having a carboxylic acid acylating function within their structure, and (b) reacting said reaction intermediate in (a) with a hydrocarbon substituted or unsubstituted N-naphthyl-phenylenediamine represented by the formula:

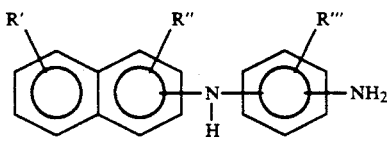

in which each of R', R" and R'" represent hydrogen or an alkyl radical having from 1 to 5 carbon atoms.

9. A lubricating oil composition according to claim 8 containing from about 0.1 to 15 weight percent of said additive composition based on the total weight of the oil composition.

10. A lubricating oil composition according to claim 9 containing from about 1 to 7.5 weight percent of said additive composition based on the total weight of the oil composition.

11. An additive composition according to claim 1 in which said N-naphthyl-phenylenediamine is N-naphthyl-m-phenylenediamine.

12. An additive composition according to claim 1 in which said N-naphthyl-phenylenediamine is N-naphthyl-p-phenylenediamine.

13. A lubricating composition according to claim 8 in which said N-naphthyl-phenylenediamine is N-naphthyl-m-phenylenediamine.

14. A lubricating composition according to claim 8 in which said N-naphthyl-phenylenediamine is N-naphthyl-p-phenylenediamine.

15. An additive composition according to claim 1 in which said N-naphthyl-phenylenediamine is a mixture of N-(1-naphthyl)-p-phenylenediamine and N-(1-naphthyl)-m-phenylenediamine.

16. An additive composition according to claim 1 in which said N-naphthyl-phenylenediamine is a mixture of N-(1-naphthyl)-p-phenylenediamine and N-(2-naphthyl)-p-phenylenediamine.

17. A concentrate for a lubricating oil comprising a diluent oil of lubricant viscosity and from about 1 to 20 weight percent of the additive composition of claim 1 based on the total weight of the concentrate.

* * * * *